US007359962B2

(12) United States Patent
Willebeek-LeMair et al.

(10) Patent No.: US 7,359,962 B2
(45) Date of Patent: Apr. 15, 2008

(54) NETWORK SECURITY SYSTEM INTEGRATION

(75) Inventors: Marc Willebeek-LeMair, Austin, TX (US); Craig Cantrell, Austin, TX (US); Dennis Cox, Austin, TX (US); John McHale, Austin, TX (US); Brian Smith, Fort Worth, TX (US)

(73) Assignee: 3Com Corporation, Marlborough, MA (US)

( * ) Notice: Subject to any disclaimer, the term of this patent is extended or adjusted under 35 U.S.C. 154(b) by 714 days.

(21) Appl. No.: 10/136,889

(22) Filed: Apr. 30, 2002

(65) Prior Publication Data

US 2003/0204632 A1 Oct. 30, 2003

(51) Int. Cl.
*G06F 15/173* (2006.01)

(52) U.S. Cl. ............... 709/223; 709/224; 709/229; 726/23; 726/24; 726/25

(58) Field of Classification Search ............... 709/203, 709/223–224, 226–229, 249, 227, 228; 713/201–202; 726/22, 23, 24, 25
See application file for complete search history.

(56) References Cited

U.S. PATENT DOCUMENTS

| | | | |
|---|---|---|---|
| 5,813,001 A | 9/1998 | Bennett | |
| 5,835,726 A * | 11/1998 | Shwed et al. | 709/229 |
| 5,878,231 A * | 3/1999 | Baehr et al. | 709/245 |
| 6,134,591 A * | 10/2000 | Nickles | 709/229 |
| 6,219,706 B1 | 4/2001 | Fan et al. | |
| 6,269,447 B1 * | 7/2001 | Maloney et al. | 713/201 |
| 6,279,113 B1 * | 8/2001 | Vaidya | 713/201 |
| 6,279,173 B1 * | 8/2001 | Denzin et al. | 4/213 |
| 6,453,345 B2 | 9/2002 | Trcka et al. | |
| 6,477,651 B1 * | 11/2002 | Teal | 726/23 |
| 6,499,107 B1 | 12/2002 | Gleichauf et al. | |
| 6,513,122 B1 * | 1/2003 | Magdych et al. | 713/201 |
| 6,519,703 B1 * | 2/2003 | Joyce | 713/201 |
| 6,550,012 B1 * | 4/2003 | Villa et al. | 713/201 |
| 6,553,377 B1 * | 4/2003 | Eschelbeck et al. | 707/10 |
| 6,611,875 B1 | 8/2003 | Chopra et al. | |
| 6,651,099 B1 | 11/2003 | Dietz et al. | |
| 6,654,882 B1 * | 11/2003 | Froutan et al. | 713/153 |
| 6,711,615 B2 | 3/2004 | Porras et al. | |
| 6,715,084 B2 * | 3/2004 | Aaron et al. | 726/23 |
| 6,725,378 B1 | 4/2004 | Schuba et al. | |
| 6,735,702 B1 * | 5/2004 | Yavatkar et al. | 713/201 |
| 6,738,814 B1 | 5/2004 | Cox et al. | |
| 6,816,973 B1 * | 11/2004 | Gleichauf et al. | 726/13 |
| 6,901,517 B1 * | 5/2005 | Redmore | 713/201 |
| 6,957,348 B1 * | 10/2005 | Flowers et al. | 726/23 |
| 6,968,377 B1 * | 11/2005 | Gleichauf et al. | 709/224 |
| 7,031,316 B2 | 4/2006 | Maher, III et al. | |

(Continued)

OTHER PUBLICATIONS

Zeltser, et al., "Inside Network Perimeter Security: Stateful Firewalls," Que Publishing, on-line article at quepublishing.com, Apr. 29, 2005.

(Continued)

*Primary Examiner*—LaShonda Jacobs
(74) *Attorney, Agent, or Firm*—Gardere Wynne Sewell LLP

(57) ABSTRACT

A network discovery functionality, intrusion detector functionality and firewalling functionality are integrated together to form a network security system presenting a self-deploying and self-hardening security defense for a network.

40 Claims, 4 Drawing Sheets

U.S. PATENT DOCUMENTS

| | | | |
|---|---|---|---|
| 7,073,198 B1* | 7/2006 | Flowers et al. | 726/25 |
| 7,084,760 B2* | 8/2006 | Himberger et al. | 340/540 |
| 2001/0052014 A1* | 12/2001 | Sheymov et al. | 709/225 |
| 2002/0023227 A1* | 2/2002 | Sheymov et al. | 713/201 |
| 2002/0116639 A1* | 8/2002 | Chefalas et al. | 713/201 |
| 2003/0135749 A1* | 7/2003 | Gales et al. | 713/200 |
| 2003/0149888 A1* | 8/2003 | Yadav | 713/200 |
| 2003/0154399 A1* | 8/2003 | Zuk et al. | 713/201 |
| 2003/0159060 A1* | 8/2003 | Gales et al. | 713/200 |
| 2004/0093513 A1* | 5/2004 | Cantrell et al. | 713/201 |
| 2004/0098623 A1* | 5/2004 | Scheidell | 713/201 |
| 2004/0250124 A1* | 12/2004 | Chelsa et al. | 713/201 |
| 2005/0229254 A1* | 10/2005 | Singh et al. | 726/23 |
| 2006/0059558 A1* | 3/2006 | Selep et al. | 726/23 |

OTHER PUBLICATIONS

"What is firewall security," SecureWorks™, Technical Resource Center, Firewall-Security, on-line newsletter at www.secureworks.com, Jul. 19, 2005.

"Addressing the Limitations of Deep Packet Inspection with Complete Content Protection," Fortinet, Inc., White Paper, dated Jan. 2004, www.fortinet.com.

Ido Dubrawski, "Firewall Evolution—Deep Packet Inspection," on-line article at www.securityfocus.com, Jul. 29, 2003.

Thomas Porter, "The Perils of Deep Packet Inspection," on-line article at www.securityfocus.com, Jan. 11, 2005.

* cited by examiner

NETWORK SECURITY SYSTEM INTEGRATION

BACKGROUND OF THE INVENTION

1. Technical Field of the Invention

The present invention relates to network security and, in particular, to an integration of a firewalling functionality, intrusion detector functionality and network discovery functionality to provide for a unified network defense structure.

2. Description of Related Art

Over the past few years, Internet usage has grown rapidly as an increasing number of computer users connect to the information super-highway. With Internet usage becoming more prevalent, enterprises are increasingly using the Internet to conduct their business. Enterprises are also exploiting the world-wide networking advantages of the Internet by connecting their internal networks to the Internet, thereby expanding their operations, facilitating communications within the enterprise, enabling e-commerce and transaction processing, and communicating with customers, suppliers and business partners. Connection to the Internet may be made at any one of a variety of access points, including major corporate offices, branch offices, remote user locations, Internet data centers and e-business Web sites.

While Internet usage is increasing, the access speed at which individuals and enterprises connect to the Internet is also increasing. Consumers and smaller enterprises are shifting from dial-up modem connections to broadband connections, using cable or digital subscriber line, or DSL, modems. These broadband connections enable users to access the Internet at speeds up to 20 times faster than a dial-up modem. Similarly, larger enterprises are moving from T1 connections and T3 connections to higher speed OC-3 connections and gigabit Ethernet connections. Web site connection speeds are also increasing as many Web sites, which were originally operated from an enterprise's own facilities, have been outsourced to Internet data centers, which deliver higher bandwidth connections.

As enterprises increasingly use the Internet to conduct business, the amount of confidential and sensitive information that is delivered over, and is accessible through, the Internet is also increasing. Unlike the private, dedicated communications networks that enterprises have used for business for the last several decades, which were relatively secure from outside intruders, the Internet and networks connected to an enterprise are susceptible to security threats and malicious eavesdropping due to their openness and ease of access. Recently, there has been an increase in the frequency of attempted breaches of network security, or hacker attacks, intended to access this confidential information or to otherwise interfere with network communications.

Network attacks are becoming not only more prevalent but also more sophisticated and severe, resulting in part from the availability of tools and information on how to conduct these attacks, an increase in hacker sophistication, an increase in the number of network access points that are vulnerable to attack and an increase in the overall amount of confidential information accessible through or delivered over the Internet. These attacks include distributed denial of service attacks, in which an attacker floods a Web site with large numbers of packets or connection requests that overwhelm the Web site and prevent legitimate users from accessing it. Other types of attacks are designed not just to prevent access to a Web site, but also to penetrate its security and allow a hacker to take control of a server and deface the Web site or steal sensitive information. Still other attacks include malicious eavesdropping, which allows a hacker to misappropriate confidential communication transmitted over the Internet. If confidential communications get into the wrong hands, damage to the business of the enterprise or, at the very least, damage its reputation may arise. There is also a significant cost and negative publicity resulting from denial of service attacks. In an attempt to combat all of these types of attacks, enterprises have been increasing their security budgets to address heightened network vulnerability concerns.

To prevent network security breaches, enterprises have deployed firewalls at the access points where their networks connect to the Internet or other networks. Firewalls are hardware or software devices that filter the content that flows into and out of an enterprise's network. The firewall is designed to block unauthorized access to the network, allowing only connections that are approved by the network administrator. However, because of the increased sophistication of hackers, and the existence of automated attack tools, firewalls alone have proven to be inadequate measures to fully protect many networks. Consequently, many enterprises have been compelled to add additional network security systems, including intrusion detection systems (IDSs) and vulnerability assessment scanners (VASs). Both the IDS and VAS assess the vulnerability of a network to attack. Intrusion detection systems are designed to expose intruders, break off the intrusion, examine the intruder's point of entry and prevent future intruders from using the same entry point. Vulnerability assessment scanners, on the other hand, are designed to discover vulnerabilities of a network system, allowing network managers to find and patch network security holes before they are discovered by hackers.

The first generation of firewalls, intrusion detection systems and vulnerability assessment scanners generally were designed to secure low bandwidth connections to the Internet. As network connection speeds have increased, these early types of security products have created significant performance bottlenecks in networks, slowing down connection speeds.

As the security needs of enterprises continued to evolve, the single-function low speed firewall, IDS and VAS products are no longer capable of cost-effectively meeting the performance and manageability needs of organizations. To deploy a complete firewall, intrusion detection system and vulnerability assessment scanner solution, an enterprise often must purchase a series of separate, expensive devices and license expensive security software, often from multiple vendors, which do not communicate with each other and cannot be interfaced with one management console system. This can result in a network security architecture that is more expensive and complex to install and manage and, as a result of this increased complexity, potentially less secure than a network that is based on a single vendor's products or an integrated solution. More specifically, enterprises have found it difficult, if not impossible, to integrate the firewall, IDS and VAS solutions together. Most security appliances require an enterprise to reconfigure network addressing to insert the appliances into its network and also require the enterprise to compromise network design in ways that reduce redundancy and, therefore, network reliability. Many times these issues have led to a significant decrease in the enterprise's network connection speed as more devices are added to the network.

An enterprise requires a broad array of high-performance, cost-effective products to secure their networks. To reduce cost and network complexity, the enterprise must increasingly look for high-performance network security solutions that can integrate firewall, IDS and vulnerability assessment capabilities into one system or appliance. It is also clear that entities desire a comprehensive network security solution from a single vendor that can scale from low-bandwidth connections to high bandwidth connections while delivering very high-speed network performance and availability. In response to this preference, existing security vendors have started to include additional capabilities in their single-function products. However, these products were not originally designed to deliver multiple functions and, as a result, the addition of these functions tends to decrease both product and network performance and increase product complexity as well as significantly increase cost.

The present invention addresses the foregoing and other concerns with a single vendor solution that integrates the functionalities performed by a firewall, IDS and VAS for network security into one system or appliance supported on a single platform.

SUMMARY OF THE INVENTION

Generally speaking, the present invention integrates a network discovery functionality, an intrusion detector functionality and a firewalling functionality together such that a self-deploying and self-hardening security defense is provided for a network. Self-deployed security defense is achieved by having the included defense functionalities work together to automate threat detection and threat response operations. Self-hardening security defense is achieved by having the included functionalities implement threat detection and threat response operations in an optimized manner that mitigates instances of false detection.

In accordance with one aspect of the present invention, network protection is provided by having an intrusion detector functionality analyze network traffic to identify entering content that is potentially harmful to the network. An alert is then generated in response to the detection of such traffic. A firewalling functionality then responds to the alert by blocking entrance of the detected traffic that is potentially harmful.

In accordance with another aspect of the present invention, network protection is provided by having an inspection agent extract features (for example, packet features) from entering traffic. These features are evaluated by the inspection agent using threat detection signatures to detect the existence of potentially harmful content in the traffic. If harmful content is detected, an entrance sentry responds to the agent detection by denying the traffic admission to the network.

In an embodiment of the invention, a network discovery functionality scans the network being protected to identify computer system and network device vulnerabilities. These vulnerabilities are used to tune the detection signature to detect those vulnerabilities in the context of the network being protected. The tuned threat detection signature is then utilized by the inspection agent to evaluate traffic features. This evaluation may be performed either at the packet level or session level.

In accordance with yet another aspect of the present invention, network protection is provided by scanning a network to identify computer system and network device vulnerabilities. A detection signature is then tailored to address the identified vulnerability in the context of a configuration of the network being protected. The signature is then instantiated on an intrusion detector functionality and/or a firewalling functionality. With respect to the intrusion detector functionality, network traffic is analyzed in view of the instantiated detection signature to identify entering content that is potentially harmful to the network. With respect to the firewalling functionality, network traffic is analyzed in view of the instantiated detection signature to block entering traffic that is potentially harmful to the network.

In accordance with yet another aspect of the present invention, network protection is provided by having an intrusion detector functionality recognize, from monitored traffic to and from the network being protected, that a new network machine is present. Responsive thereto, network discovery scanning of the network is triggered to determine whether the addition of the new network machine raises a vulnerability concern. If so, a detection signature for that vulnerability concern is instantiated on the intrusion detector to protect the new network machine against the vulnerability concern.

In accordance with still another aspect of the present invention, a trusted network is scanned to obtain vulnerability information concerning the network elements therein. As a result of this scan, first and second vulnerability information is generated concerning the network elements connected to a first and second physical interface, respectively. Responsive to the vulnerability information, first and second detection signatures are instantiated to monitor traffic over the first and second physical interfaces, respectively, for any threats to the trusted network.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Network security systems, generally speaking, are a compendium of three devices: a vulnerability assessment scanner (VAS); an intrusion detection system (IDS); and a firewall. In the prior art, these devices are disparate, often supplied by different vendors, and are rarely designed or installed in a way that facilitates collaborative defense efforts. This legacy defense system architecture leaves much to be desired in terms of dynamic response, dynamic configuration, integration, cooperation and collaboration. The present invention addresses the foregoing and other concerns.

Figure 1:
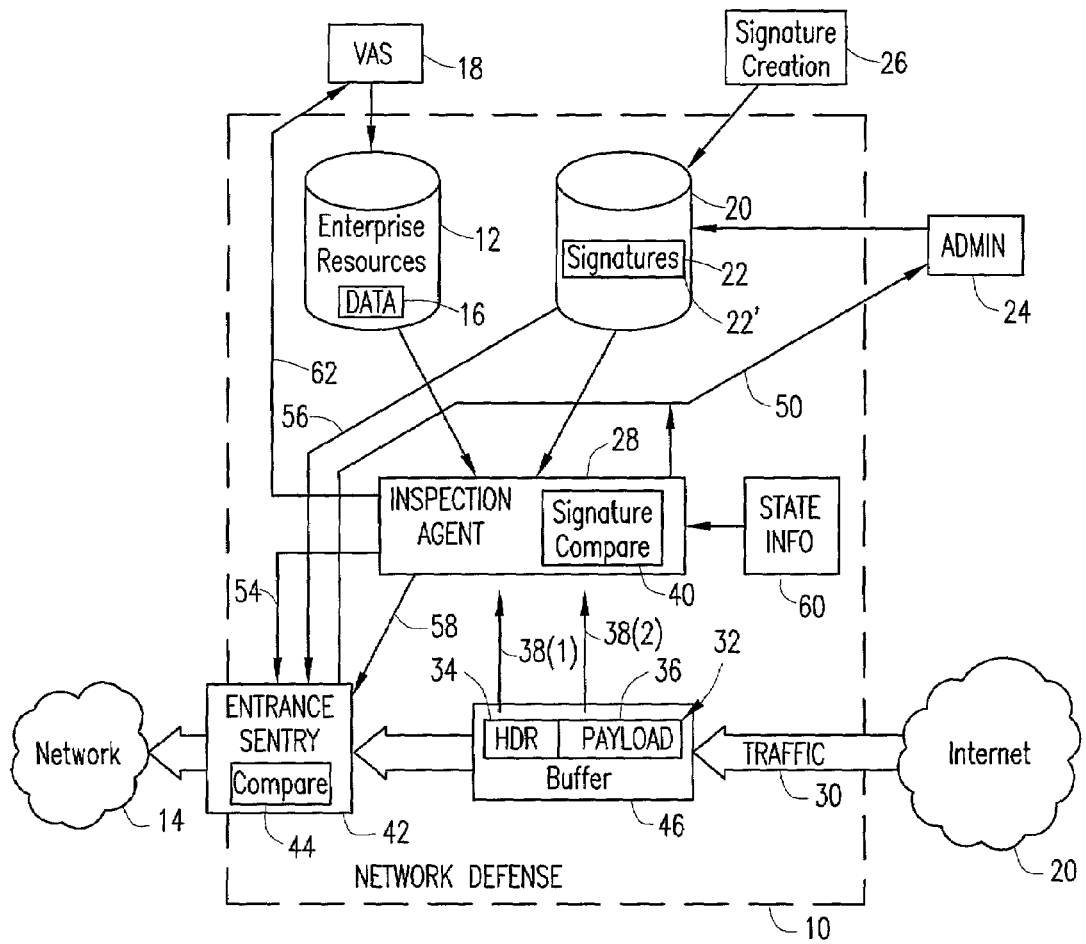
FIG. 1 is a block diagram for a unified network defense system in accordance with the present invention.

Reference is now made to FIG. 1 wherein there is shown a block diagram of a unified network defense system 10 in accordance with the present invention. The system 10 is configured to integrate a network discovery functionality, an intrusion detection functionality and a firewalling functionality together to act as a single, highly intelligent, highly adaptive, network-based information security system. The system 10 is advantageously self-deploying (i.e., the various components of the system work together to automate the threat detection and response operation) and self-hardening (i.e., the operation of the threat detection and response functionality is optimized to mitigate instances of false detection).

The system 10 includes an enterprise resource database 12 containing enterprise (i.e., a protected network 14) specific data 16 identifying machines (hosts) in the network, services provided by the hosts, and potential computer system and network device vulnerabilities associated with those machines and services in the context of the network configuration. This data 16 may be collected in any one of a number of well known ways, including, for example, the use of a separate, prior art, vulnerability assessment scanner 18 device (configured internally or externally) that operates to assess the protected network 14 in a conventional manner.

The system 10 further includes a signature database 20 that stores detection signatures 22 (comprising, for example, security rules, policies and algorithms) that are designed to mitigate or avert network damage from detected vulnerabilities. These signatures 22 may be obtained from any one of a number of well known sources, including, for example, machine (host) manufacturers, service suppliers, the Internet, and the like. Additionally, the signatures 22 may be created by an administrator 24 of the protected network 14. Still further, the signatures 22 may be supplied by a entity 26 in the business of signature creation, where that entity operates to collect threat information (for example, worm, virus, trojan, DoS, Access, Failure, Reconnaissance, other suspicious traffic, and the like) from around the world, analyze that information and design detection signatures 22 that can be used by others to mitigate or avert network damage from the collected threats.

The system 10 still further includes an inspection agent 28 that operates to inspect traffic 30 that is entering the protected network 14. The traffic 30 generally comprises packet 32 traffic, with each packet including a header portion 34 and a payload portion 36. The inspection operation performed by the inspection agent 28 involves first extracting 38 from the traffic 30 certain packet features of interest for inspection. More specifically, the extraction of packet features may comprise features 38(1) from the header portion 34 (such as, for example, destination and source IP address, destination and source ports, and the like) and/or features 38(2) from the payload portion 36 (such as, for example, character strings, regular expressions, and the like).

The inspection operation performed by the inspection agent 28 next involves comparing 40 the extracted packet features against the detection signatures 22 obtained from the signature database 20. These detection signatures 22, generally speaking, include an object defining criteria (for example, TCP, HTTP and URI related criteria) that must be met by one or more of the extracted packet features in order to detect a potential threat to the network 14 posed by the inspected traffic 30.

In the event that the comparison 40 operation performed by the inspection agent 28 is satisfied (i.e., there is a criteria match), any one (or more than one) of a number of possible actions (specified by an object within the detection signature 22 itself) may be taken by the system 10. For example, the inspection agent 28 may issue an alarm report 50 to the administrator 24. The identification of the threatened machine (host) or service is provided using information contained in the report 50. The inspection agent 28 may also move immediately to block the threatening traffic 30 (as will be described in more detail herein) or terminate a session associated with the threatening traffic 30 (perhaps using a TCP reset).

The detection signatures 22 may be applied by the inspection agent 28 as they are obtained from the database 20 (i.e., without alteration or change). Alternatively, the detection signatures 22 retrieved from the database 20 may be tailored by the inspection agent 28 and optimized to the needs and configuration of the particular network 14 being protected. To that end, the agent 28 considers the enterprise (i.e., network 14) specific data 16 stored in the enterprise resources database 12, and modifies the detection signature 22 to ensure that the detection criteria and response actions are tailored to the network 14. More specifically, the enterprise specific data 16 is considered by the agent 28 when instantiating a detection signature 22 so that the signature (either through its criteria or its response instructions) is instantiated in a way that minimizes the likelihood that false positive alarms will be generated.

As discussed above, the inspection agent 28 may act, following the detection of threatening traffic, to immediately block the threatening traffic 30 from entering the network 14. To accomplish this goal, the system 10 further includes a gatekeeping functionality performed by an entrance sentry 42. The entrance sentry 42 is an in-line component of the system 10. By "in-line" it is meant that all traffic 30 must pass through the entrance sentry 42 before entering the protected network 14. Responsive to the detection of threatening traffic 30, the inspection agent 28 issues a blocking command 54 to the entrance sentry 42. This command 54 includes sufficient information to allow the entrance sentry 42 to identify the threatening traffic 30 and deny it entry to the protected network 14. The sentry 42 then compares 44 the command 54 information against the traffic 30 (more specifically, against each packet 32). In the event there is a match, the matching traffic 30/packet 32 is denied entry to the network 14 and is discarded. Otherwise, entrance to the network 14 is permitted.

To assist the sentry 42 in being able to stop entry of the specific piece of traffic determined by the inspection agent 28 to be threatening, the system 10 further includes a buffer 46 to temporarily store the packets 32 and slow their passage through the system 10 for a length of time sufficient to allow the extraction 38, comparison 40 and issuance of the command 54 to occur before the packets reach the sentry. It will, of course be recognized that other techniques known to those skilled in the art for delaying the passage of the packets through the system 10 may be employed as needed. Additionally, in some applications of the system 10, no buffer may be required. Still further, it will be recognized that the buffer 46 may be included within the entrance sentry 42.

The entrance sentry 42 further functions in another protection mode. In this mode, detection (blocking) signatures 22' are downloaded either directly from the database 20 to the entrance sentry 42 (see, reference 56) or indirectly through the inspection agent 28 (see, reference 58). The sentry 42 operates to comparing 44 the packets 32 passing in-line therethrough against the downloaded detection (blocking) signatures 22. As discussed above, the detection (blocking) signatures 22', generally speaking, include an object defining criteria that must be matched by the packets 32 in order to detect a packet 32 in the traffic 30 that should be blocked. More specifically, and in a manner similar to that performed by the comparison operation 40 of the inspection agent 28, the sentry 42 examines features in the header portion of the packets 32 in comparison to the (blocking) signature defined detection criteria to make the threat detection determination and block passage of that packet.

In the event that the comparison 44 operation performed by the sentry 42 with respect to the detection (blocking) signature 22' is satisfied (i.e., there is a criteria match), any one (or more than one) of a number of possible actions (specified by an object within the detection (blocking) signature 22' itself) may be taken by the system 10. For example, the sentry 42 may issue an alarm report 50 to the administrator 24. The identification of the threatened machine (host) or service is typically available from the information contained in the report 50. The sentry 42 may also move immediately to terminate a session associated with the threatening traffic 30 (perhaps using a TCP reset).

Where the detection (blocking) signatures 22' are directly downloaded 56, they are applied by the sentry 42 as they are obtained from the database 20 (i.e., without alteration or change). Alternatively, when indirectly downloaded 58 from the database 20, the detection (blocking) signatures 22' may be tailored by the inspection agent 28 and optimized to the needs and configuration of the particular network 14 being protected. To that end, the agent 28 considers the enterprise (i.e., network 14) specific data 16 stored in the enterprise resources database 12, and modifies the detection (blocking) signature 22' to ensure that the detection criteria and response actions are tailored to the network 14. More specifically, the enterprise specific data 16 is considered by the agent 28 when instantiating a detection (blocking) signature 22' on the entrance sentry 42 so that the signature (either through its criteria or its response instructions) is instantiated in a way that minimizes that likelihood that false positive alarms will be generated.

The comparison operation 40 performed by the inspection agent 28 on the extracted 38 packets 32 may be implemented on either or both the packet level or the session level. On a packet level, the inspection agent 28 considers each packet 32 individually when applying the detection signatures 22. On a session level, the inspection agent 28 considers a plurality of related packets 32 together when applying the detection signatures 22. To assist in session level comparison 40, the system 10 further includes a state information memory 60 that stores historical packet related data. Examples of the types of historical packet related data that may be retained by the memory 60 include:

reassembly of fragmented packets;

reassembly of TCP session flows;

maintenance of negotiated ephemeral ports (for example, FTP establishes a dynamic port over which to exchange data);

connection establishment state (proper handshake between communicating hosts such as, for example, the well-defined exchange for TCP in establishing a connection); and protocol and application level state information (ensuring that applications or protocols are transitioning to well-defined states that do not violate the specifications of those applications or protocols or exploit known vulnerabilities in those applications or protocols). For a session level comparison, the agent 28 not only considers the extracted 38 packet features (header and payload) for the current packet 32 under examination, but also historical packet related data retrieved from the memory 60. In the event of a match between the signature 22 criteria and the combined extracted packet features and historical packet related data, the agent 28 detects a potential threat to the network 14 posed by the traffic 30.

The system 10 may operate in a scenario (see, also, FIGS. 3 and 4) where the VAS 18 completes a scan of the network 14, updates the database 12 and further informs the inspection agent 28 of a discovered network vulnerability. Responsive thereto, the inspection agent 28 retrieves an appropriate detection signature(s) 22/22' from the database 20 and instantiates that signature on its comparison functionality 40 and/or the sentry's comparison functionality 44. These functionalities then operate in accordance with the signature(s) 22/22' to detect and respond to detected threats posed by the traffic 30.

In another potential operating scenario (see, also, FIG. 5), the system 10 may utilize the inspection agent 28 to trigger network vulnerability detection and response. In this scenario, the inspection agent 28 monitored traffic 30 in the manner discussed above. The focus here is on the header portion 38(1) and more specifically the IP addresses, port identifications, physical interface, and the like, of the packets in the monitored traffic. By examining this portion 38(1), perhaps using the comparison functionality 40, the agent 28 may recognize, from detection of a new IP address, for example, that a new network machine is present. This comparison operation is supported by keeping a record (for example, using a table in the memory 60) of the IP addresses for the known machines in the network 14. Responsive thereto, the agent 28 triggers 62 the vulnerability assessment scanner 18 to scan the network 14 and determine whether a new machine has been added, and further whether the addition of that new network machine raises a vulnerability concern. Following completion of the scan, the database 12 is updated and the agent 28 informed of new vulnerabilities. The agent 28 then retrieves a detection signature for that new vulnerability for instantiation in either comparison functionality 40 (as necessary) to protect the new network machine against the vulnerability concern.

Figure 2:
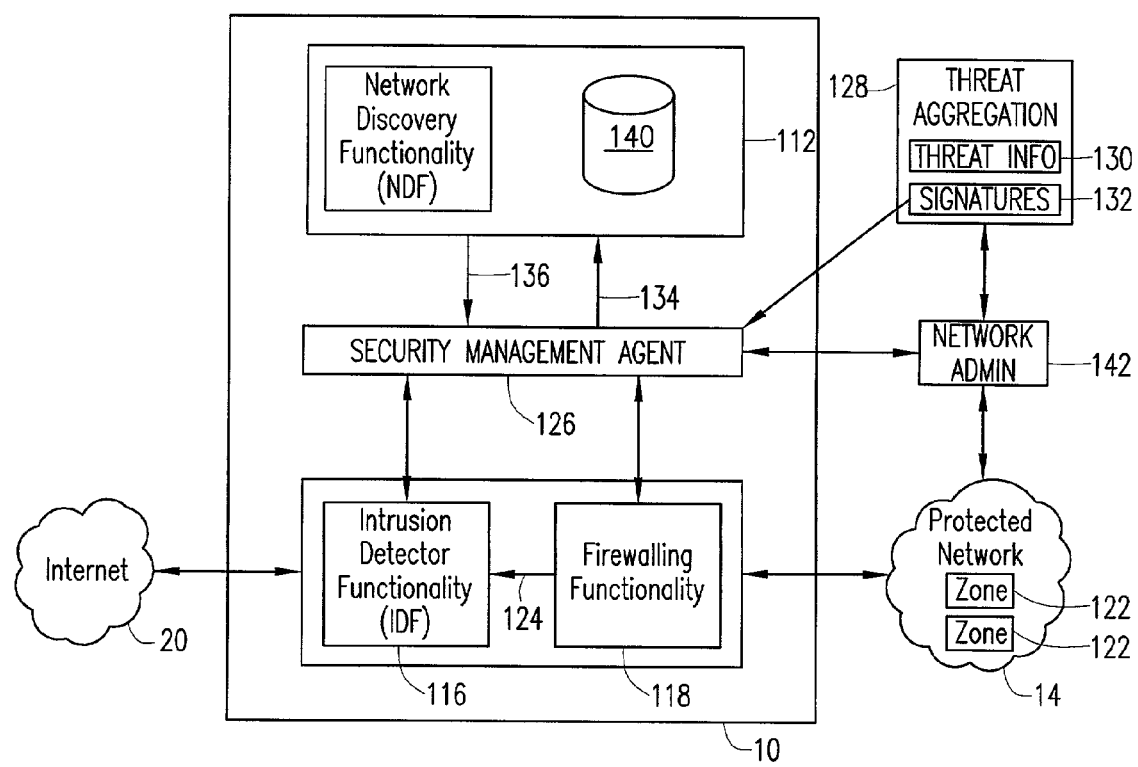
FIG. 2 is a block diagram for an exemplary integrated architecture of a unified network defense system in accordance with the present invention.

Reference is now made to FIG. 2 wherein there is shown a block diagram for an exemplary integrated architecture of a unified network defense system 10 in accordance with the present invention. The system 10 includes a network discovery functionality (NDF) 112 that continually operates to assess the protected network 14 for computer system and network device vulnerabilities which may arise at any time in connection with, for example, the installation of a new client, server, networking device or application. The assessment provided by the network discovery functionality 112 produces enterprise (i.e., network 14) specific data identifying potential computer system and network device vulnerabilities. The produced data is supplied by the system 10 and used to trigger the taking of certain threat mitigation or elimination actions.

The system 10 further includes an intrusion detector functionality (IDF) 116 that continuously analyzes network traffic to identify content that is potentially harmful to the network 14 (see, also, inspection agent 28 and compare functionality 40 in FIG. 1). The intrusion detector functionality 116 is configurable and responds to system tuning to adjust its operation to mitigate or avert network damage from recognized threats. Best of breed detection capabilities are implemented by the intrusion detector functionality 116.

A in-line firewalling functionality 118 is also included in the system 10 to prevent unauthorized access to the network 14 from another network, for example, the Internet 20 (see, also, sentry 42 and compare functionality 44 in FIG. 1). The firewalling functionality 118 operates to implement a stateful, full packet inspection of passing traffic and then make, on a packet-by-packet basis decisions concerning accepting, denying or tapping of those packets. The firewalling functionality 118 is configurable and responds to system tuning, as well as interlocking instructions received from the intrusion detector functionality 116 (as will be described), to adjust its operation to mitigate or avert network damage from recognized threats. The firewalling functionality 118 manages advanced firewall functionalities including: encryption acceleration; NAT/PAT; traffic shaping and URL filtering. Independent management of plural zones 122 within the network 14 may be employed. In this way, the firewalling functionality 118 may be independently tuned to provide threat protection on a zone-by-zone basis.

The present invention advantageously integrates the network discovery functionality 112, intrusion detector functionality 116 and firewalling 118 these functionalities in a single system 10 and on a common platform that can be supplied by a single vendor to an enterprise for the purpose of defending its network 14.

In accordance with one aspect of this integration, the intrusion detector functionality 116 and the firewalling functionality 118 are interlocked 124 such that the firewalling functionality becomes an adaptable defense measure that can take alerts generated by the intrusion detector functionality from its analysis of the network traffic content (see, also, command 54 in FIG. 1). Responsive to these alerts, the firewalling functionality 118 adapts in real-time to the active threats and stops malicious traffic at the edge of the network 14 before it can enter, infect and debilitate the network systems. For example, responsive to the interlocking 124 instructions indicative of imminent attack as detected by the intrusion detector functionality 116, the firewalling functionality 118 responds by, for example, dropping packets or shutting down the session or origin of the attack.

In accordance with another aspect of the integration of the present invention, the system 10 includes a security management agent 126 that functions to configure, tune and monitor the operation of the intrusion detector functionality 116 and the firewalling functionality 118 (see, also, agent 28 in FIG. 1). This tuning operation in general comprises the issuance of instructions to the intrusion detector functionality 116 and the firewalling functionality 118 specifying what they should be on the look out for and what should be done when it is detected. More specifically, the agent 126 instantiates detection signatures to the intrusion detector functionality 116 and the firewalling functionality 118 that are tailored to a certain perceived threat to the network 14. Each instantiated detection signature includes a set of criteria which the intrusion detector functionality 116 and/or firewalling functionality 118 compare against traffic. The detection signature further includes response instructions which the intrusion detector functionality 116 and/or firewalling functionality 118 follow in the event the comparison reveals a match between the supplied criteria and the monitored traffic.

The tuning operation that is performed by the agent 126 preferably occurs in an automated manner. To that end, the agent 126 responds to the network discovery functionality 112 and its continued assessment of the protected network 14 for computer system and network device vulnerabilities by triggering the application of the proper detection signature to one or more of the intrusion detector functionality 116 and/or firewalling functionality 118 in response to detected vulnerabilities. This cooperative defense effort between the network discovery functionality 112, intrusion detector functionality 116 and firewalling functionality 118, through the efforts of the agent 126 and the interlocking 124 tunings, effectuates a self-deploying system 10.

The tuning operation that is performed by the agent 126 further occurs in a manner that is optimized to the network 14 being protected. To that end, the agent 126 confers with the network discovery functionality 112 to ensure that the detection signatures supplied to the intrusion detector functionality 116 and firewalling functionality 118 are tailored to the collected enterprise (i.e., network 14) specific data. More specifically, the enterprise specific data is considered by the agent when issuing a detection signature so that the signature (either through its criteria or its response instructions) is designed in a way that minimizes the likelihood that false positive alarms will be generated. This cooperative defense effort between the network discovery functionality 112, intrusion detector functionality 116 and firewalling functionality 118, through the agent 126 tailoring the detection signatures based on enterprise specific data, effectuates a self-hardening system 10.

In summary, the agent 126 operates to assess changes to the network 14 detected by the network discovery functionality 112, confirm their validity, and inform the intrusion detector functionality 116 to tune its operation so that false alerts are not generated when the new, but nonetheless valid, information types are encountered in the network traffic content. Additionally, the agent 126 can, like the interlocking function 124, adapt the firewalling functionality 118 to block access to the network 14 from another network that could be trying to exploit a scanning functionality 112 recognized vulnerability. It will accordingly be recognized that the threat detection (IDF) and threat suppression (firewalling) capabilities of the system 10 are continually being optimized (by the interlocking 124 and agent 126 functionalities) in response to continuous threat assessment (NDF) analysis.

External to the system 10, a threat aggregation functionality 128 stores threat information 130 (for example, worm, virus, trojan, DoS, Access, Failure, Reconnaissance, other suspicious traffic, and the like) collected from around the world. The collected information 130 is then analyzed and utilized by the network administrator 142 to design the detection signatures 132 (comprising, for example, security rules, policies and algorithms) that can be used by the system 10 to mitigate or avert network damage from the collected threats (see, also, signatures 22 and database 20 of FIG. 1). These signatures 132 are correlated by the functionality 128, for example, in a relational database structure, to the particular vulnerabilities that they address. In this way, the agent 126 may operate, responsive to a network discovery functionality 112 detected vulnerability, to retrieve the correlated one (or ones) of the signatures 132 stored by the functionality 128.

The detection signatures 132, generally speaking, each include the following objects:

meta data: describing the name, identification, category and class of the signature;

action set: a definition of the action or actions (permit, deny, log, block, terminate, and the like) to be performed by the system 10 if the threat is detected;

query: a definition (or identification) of the particular network component(s) (machine set) that is threatened and to which the signature applies; and signature definition: the set of criteria that must be matched in order for the threat to be identified along with any associated parameters that must be considered.

The detection signatures 132 are supplied to the agent 126 either at the initiative of the network administrator 142, or in response to a request from the agent triggered by a threat detected by the network discovery functionality 112. In either case, the detection signature 132 are converted by the agent 126 into lower level machine code that is supplied to the intrusion detector functionality 116 and/or firewalling functionality 118 to effectuate the tuning of the system 10 against a certain perceived threat by filtering of the packets (traffic).

Before the detection signature 132 (more specifically, the machine code related thereto) is installed in the intrusion detector functionality 116 and/or firewalling functionality 118, the agent 126 may first query 134 the network discovery functionality 112. The query 134 implicates the information contained in the query object of the detection signature 132. It will be remembered that the detection signature 132 includes in the query object a definition (or identification) of the particular network component(s) (machine set) that is threatened and to which the signature applies. The issued query 134 is sent based on that definition of threatened network components in order to retrieve enterprise specific data (such as, for example, IP addresses and ports) 136 that is pertinent to the signature 132 (see, also, data 16 and database 12 of FIG. 1). This retrieved data 136 is then evaluated by the agent 126 for the purpose of determining whether the detection signature 132 is relevant to the particular network 14 being protected. By querying 134 the network discovery functionality 112 and retrieving the pertinent enterprise specific data 136 for evaluation in the context of the signature, the agent 126 may: (a) decide whether to instantiate the detection signature at all on the intrusion detector functionality 116 and/or firewalling functionality 118; (b) decide whether to restrict the signature to a specific set or segment of machines in the network 14; and/or (c) decide which one or ones of the actions to be installed with the signature.

Each of the foregoing decisions assists with the provision of the self-deploying and self-hardening functionalities by the system 10. In general, by deciding whether the detection signature is relevant to the environment of the network 14 being protected, the agent 126 may ensure that a vulnerability exists in the network which must be protected against, and that the alerts generated from providing that protection are pertinent to the network administrator 142. In this way, the agent 126 assists in reducing the likelihood that false positive alarms will be generated, and further tailors to the intrusion detector functionality 116 and/or firewalling functionality 118 to be sensitive to the specific recognized vulnerabilities of the network 14 being protected, and not the vulnerabilities in a global sense that may generally be of concern.

The foregoing may be better understood by consideration of an example. Consider, for the moment, a situation where the threat aggregation functionality 128 collects and stores a piece of threat information 130 relating to a particular attack. Analysis of the collected threat information 130 reveals that the attack is directed toward a particular network component (for example, HTTP services). Using that information, the network administrator 142 designs a detection signature 132 to address the attack. The detection signature is then provided to that agent 126. The detection signature 132 includes the following objects:

action set: block and terminate that traffic associated with the attack;

query: identification of IP ports of a host on the network 14 that provide HTTP services as being threatened by the attack; and signature definition: the criteria that must be met in one or more packets for detecting instances of the attack, for example, information in a header portion of the packet(s) and/or certain content strings in the payload portion of the packet(s).

Responsive to the detection signature, the agent 126 queries 134 the network discovery functionality 112 to retrieve information as to whether any IP ports of a host on the network 14 provide HTTP services. Responsive enterprise specific data 136, identifying the IP ports, hosts, and related machine data that provide HTTP services, is then supplied to the agent 126. Using the supplied data 136, the agent decides whether to instantiate the detection signature on either or both the intrusion detector functionality 116 and firewalling functionality 118 to address the perceived attack threat. This decision is made in view of the supplied enterprise specific data 136. If the data 136 indicates that there are no machines in the network 14 that are susceptible to the attack, there would be no need to instantiate the detection signature 132 at all. If there is, however, a risk from the attack in the network 14 environment, the agent 126 next decides whether to restrict the signature to a specific set or segment of machines in the network 14. Again, this decision is made in view of the supplied enterprise specific data 136. If only certain machines in the network 14, or certain zones within the network, are susceptible to the attack, then the detection signature 132 is instantiated on only the intrusion detector functionality 116 and/or firewalling functionality 118 that protect the threatened portions of the network. Lastly, before instantiating the detection signature 132 as needed, the agent 126 tailors the action set so that the actions taken responsive to the detection of the attack are appropriate. In this case, the detection signature 132 specifies block and terminate actions to be taken. In implementing these actions, the agent 126 may establish a block action to be taken by the firewalling functionality 118 to block the attack-related traffic, and a terminate action to be taken by the intrusion detector functionality 116 to terminate any session associated with a possible attack.

As another example illustrating the operation of the agent 126, assume that the network 14 includes a Linux host running an Apache web server. The threat aggregation functionality 128 collects and stores a piece of threat information 130 relating to a network vulnerability relating the malicious code intended to exploit a Microsoft IIS web server running on a Microsoft operating system. The network administrator 142 may design a detection signature 132 for this particular threat. The detection signature 132 is then provided to the agent 126. The agent, noting the query object specification of Microsoft IIS web servers and Microsoft operating systems, then queries 134 the network discovery functionality 112 to retrieve information as to whether any Microsoft IIS web servers and/or Microsoft operating systems exist on the network 14. Responsive enterprise specific data 136, identifying the machines of the network using Microsoft IIS web servers and/or Microsoft operating systems, is then supplied to the agent 126. Using the supplied data 136, the agent 126 decides whether to instantiate the detection signature on either or both the intrusion detector functionality 116 and firewalling functionality 118 to address the perceived threat. This decision is made in view of the supplied enterprise specific data 136. If the data 136 indicates that there are no machines in the network 14 that are susceptible to the threat (for example, there are no machines with using Microsoft IIS web servers and/or Microsoft operating systems), the agent could choose not to instantiate the detection signature 132 at all. If there is, however, a risk from the threat in the network 14 environment, or if there would be some benefit from tracking attempts to exploit the network using this threat, the agent 126 may decide to instantiate. However, before instantiating the detection signature 132, the agent 126 tailors the action set so that the actions taken responsive to the detection of the threat are appropriate. For example, if there are no machines with using Microsoft IIS web servers and/or Microsoft operating systems, the threat is not valid in the particular network 14 configuration being protected and the agent 126 may tailor the action set to merely log the attack rather than take action against the attack. In this way, no false positive alerts are generated.

Figure 3:
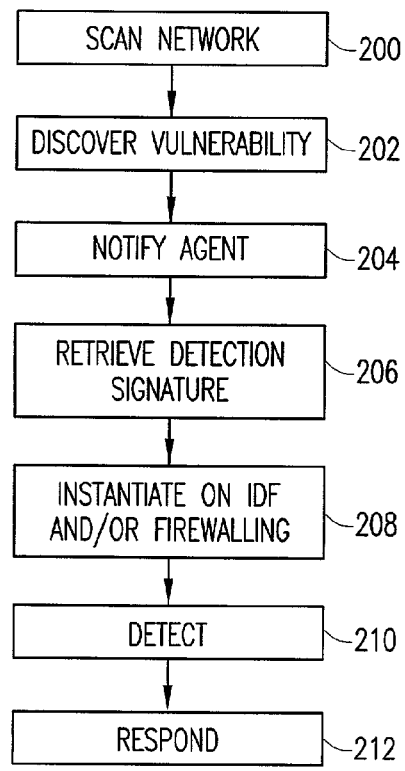
FIG. 3 is a flow diagram illustrating an exemplary operation of the system of FIGS. 1 and 2.

Reference is now made to FIG. 3 wherein there is shown a flow diagram illustrating an exemplary operation of the system 10. First, in step 200, the network discovery functionality 112 scans the network 14 and collects an inventory of enterprise specific data concerning, for example, the active hosts on the network, the services on those hosts, and the known vulnerabilities which are present with respect to those services. If the network discovery functionality 112 discovers a vulnerability (step 202), the agent 126 is notified in step 204. Responsive thereto, the agent 126 retrieves from enterprise vulnerabilities database 132 (step 206) a detection signature 132 associated with the discovered vulnerability. The detection signature 132 is tailored in the context of the network configuration and then instantiated in step 208 toward the intrusion detector functionality 116 and/or firewalling functionality 118 for the purpose of tuning (or configuring) their operation to protect the network 14 against the recognized vulnerability. If the intrusion detector functionality 116 and/or firewalling functionality 118 subsequently detects traffic that matches the criteria of the detection signature 132 (step 210), the threat response actions defined by that signature are then invoked in step 212 (for example, the traffic is logged or blocked, an alert is generated to the network administrator 142, a session is terminated, or the like).

Reference is once again made to FIG. 2 for additional description of the operational characteristics of the system 10.

Router protection is provided by the firewalling functionality 118 responsive to the instantiation of detection signature 132 to limit routing protocol messages from known good peer routers. To accomplish the foregoing, the firewalling functionality 118 operates in three modes: a transparent mode where no modification of packet addresses is made; an NAT mode where automatic IP address and port rewriting is implemented to secure internal topology information; and a route mode where a two-interface gateway router functionality is supported thus allowing the system 10, and in particular the firewalling functionality 118, to replace legacy firewall installations that also function as routers.

The network discovery functionality 112 is primarily responsible for maintaining an enterprise vulnerabilities database 140 that stores the enterprise specific data collected by the network discovery functionality. It is this database 140 that is queried 134 by the agent 126, as discussed above. The stored data may comprise, for example, host/service inventory information which includes an inventory of assessed vulnerabilities of the network 14. The stored data may also include information on valid peer routers, with this information being useful in maintaining router white lists for filtering routing control traffic. For example, responsive to a network discovery functionality scan of the network 14, the database 140 may store an inventory of the active hosts on the network, the services provided by those hosts, and the known vulnerabilities of the hosts. This information is then used by the system 110, in view of the detection signatures 132, to adapt the operation of the intrusion detector functionality 116 and firewalling functionality 118 by tailoring the signatures in the context of the network configuration to protect the hosts from attackers attempting to exploit the noted and detected vulnerabilities.

The assessment operation performed by the network discovery functionality 112 operates at three depths: normal; deep; and, ultra-deep. The normal depth scan generally comprises basic scans of the network 14 that are fast and do not crash a host. For example, the normal scan may determine the operating system (and its version), the service applications on the host, the software version for those services. The deep depth scan performs vulnerability assessments that can be safely executed without crashing a host. Deep depth scans interact with the services on a host to determine whether a vulnerability exists. The deep scan generally takes more time than the normal scan. The ultra-deep scan tests for all known vulnerabilities, even at the risk of crashing a host. Ultra-deep scans may actually perform an attack to determine vulnerability and interact with the actual service in such a way that it might compromise the system. The network discovery functionality 112 receives notification of attempts to access a new service and this is used to automatically trigger a normal and/or deep scan (ultra-deep scans are performed only on the instruction of a network administrator 142).

The vulnerability assessments generated by the network discovery functionality 112 are presented to a network administrator 142, in detail or summary form, with enough information for the administrator to make a rapid, high level decision on responding to the vulnerability. The information provided to the administrator 142 may include severity assessment and links to vendor patches and other pertinent data from the web that would assist in addressing the vulnerability. Responsive to this presentation, the network administrator 142 may specify the actions to be taken in order to defend the network 14 using detection signatures 132.

Figure 4:
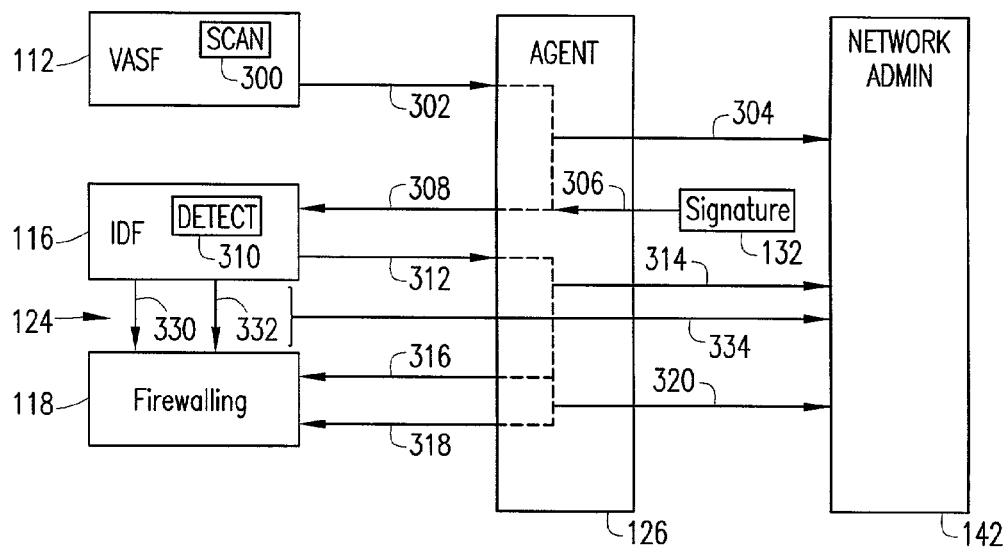
FIG. 4 is a flow diagram illustrating an exemplary operation of the system of FIGS. 1 and 2.

Reference is now made to FIG. 4 wherein there is a flow diagram illustrating an exemplary operation of the system 10. In step 300, the network discovery functionality 112 scans the network 14 and discovers a certain vulnerability (for example, a ".ida" vulnerability) relating to a web server in the network. This vulnerability is reported to the agent 126 in step 302. The agent 126 updates the network administrator 142 that the web server on the network 14 is vulnerable in step 304. The agent 126 further retrieves (step 306) a detection signature 132 (for example, code red) associated with the discovered vulnerability (for example, an IIS buffer overflow). This detection signature 132 is then activated (i.e., instantiated) in the intrusion detector functionality 116 in step 308. Subsequently, the intrusion detector functionality 116 detects in step 310 an attempt from outside the network 14 to exploit the noted vulnerability (for example, a certain IP address is noted as being a source of traffic relating to the IIS buffer overflow vulnerability as detected by the code red signature). This is reported back to the agent 126 in step 312. The agent 126 responds in step 314 by reporting to the network administrator 142 that an attempt to exploit has occurred. The agent 126 further instructs the firewalling functionality 118 in step 316 to drop the packet traffic relating to the attempted exploitation. Additionally, the agent 126 instantiates a policy on the firewalling functionality 118 in step 318 instructing the firewall to block all traffic originating from the noted IP address of the attacker. The network administrator 142 is then updated in step 320 that traffic from the noted IP address has been blocked.

As an alternative, the intrusion detector functionality 116 may take advantage of the interlocking 124 functionality and respond to the step 310 detection by instructing the firewalling functionality 118 in step 330 to drop the packet traffic relating to the attempted exploitation. Additionally, the intrusion detector functionality 116 may further take advantage of the interlocking 124 functionality agent 126 by authorizing activation of a policy by the firewalling functionality 118 in step 332 that instructs the firewall to block all traffic originating from the noted IP address of the attacker. In each case, the network administrator 142 is updated in step 334 as to the protection efforts being taken by the integrated system 10.

Figure 5:
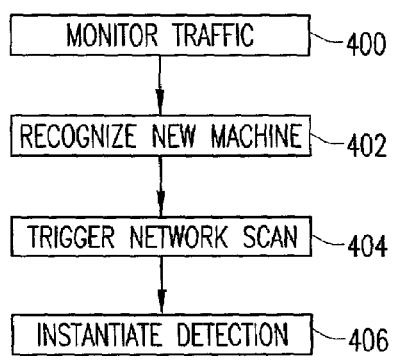
FIG. 5 is a flow diagram illustrating an exemplary operation of the system of FIGS. 1 and 2.

Reference is now made to FIG. 5 wherein there is shown a flow diagram illustrating an exemplary operation of the system of FIGS. 1 and 2. In step 400, the intrusion detector functionality 116 monitors traffic to and from the network being protected. By examining IP addresses, port identifications, physical interfaces, and the like, for that monitored traffic, the intrusion detector functionality 116 recognizes in step 402 that a new network machine is present. For example, the intrusion detector functionality 116 may keep a record (for example, using a table) of the IP addresses for the known machines in the network 14. In performing the step 400 monitoring and the step 402 examination, in view of the IP address table, the intrusion detector functionality 116 can readily recognize the use of an unknown IP address that would be indicative of new machine presence in the network. Responsive thereto, network discovery scanning of the network 14 is triggered in step 404 to determine whether the addition of the new network machine raises a vulnerability concern. If so, a detection signature for that vulnerability concern is instantiated in step 406 on the intrusion detector functionality 116 to protect the new network machine against the vulnerability concern.

Figure 6:
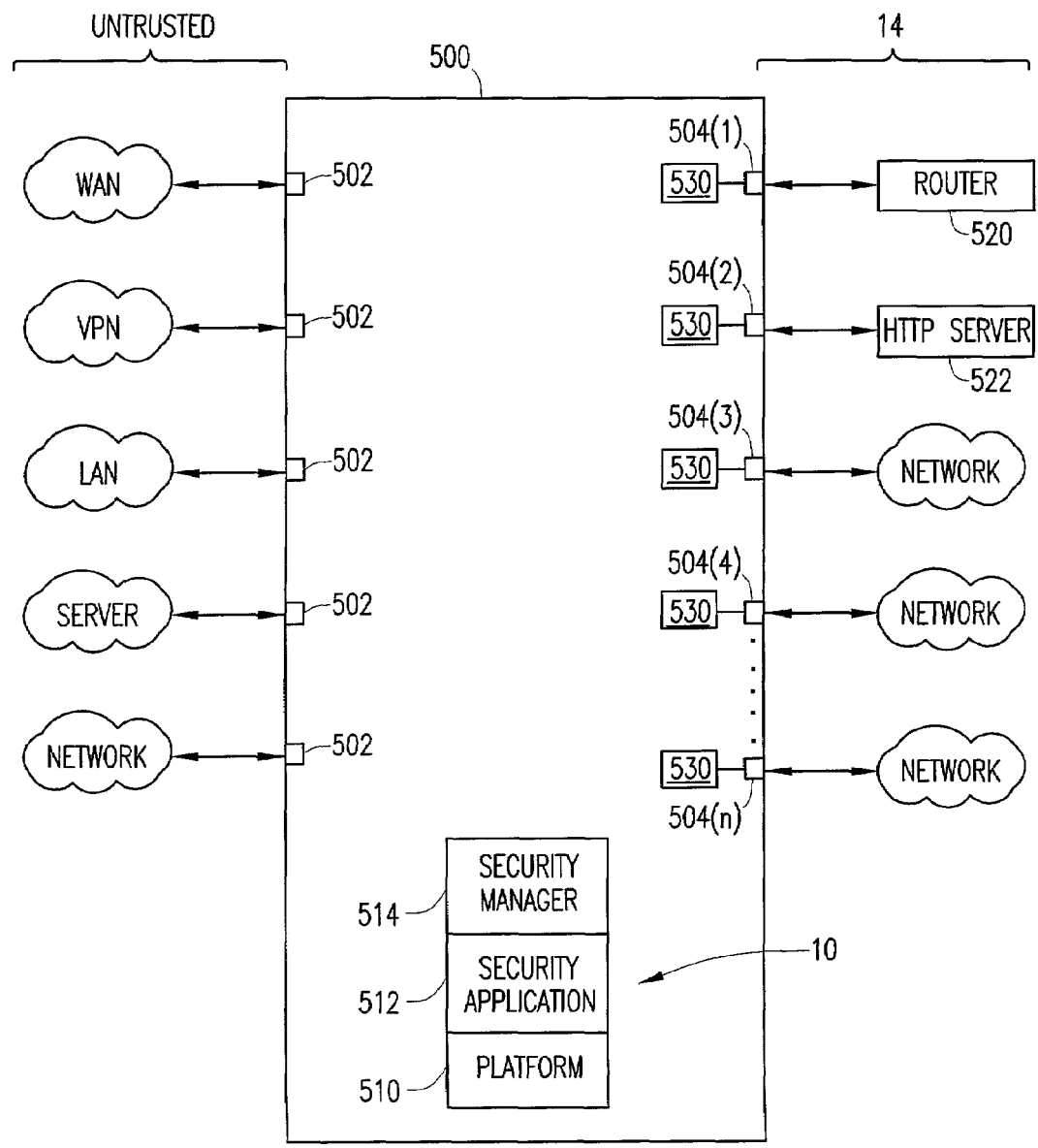
FIG. 6 is a block diagram of a threat prevention appliance that utilizes the unified network defense system of FIGS. 1 and 2.

Reference is now made to FIG. 6 wherein there is shown a block diagram of a threat prevention appliance 500 that utilizes the unified network defense system 10 of FIGS. 1 and 2. The threat prevention appliance 500 is configured as a network element in the protected network 14. The appliance 500 includes a number of external physical interfaces 502 that allow the appliance to be connected to the outside world (i.e., the untrusted world outside of the protected network 14). As an example, the untrusted world may comprise any one or more of the following: a wide area network (WAN); a virtual private network (VPN) server; local area network (LAN) clients; a wireless or remote access server; and, an untrusted network (such as the Internet). A number of internal physical interfaces 504 are included to allow the appliance 500 to be connected to the elements of the protected (trusted) network 14. As an example, the elements of the protected network 14 may include: a router; special server types (for example, HTTP, SMTP, FTP, DNA, and the like); an intranet; personal computers; and, network zones. It will be recognized (although not specifically illustrated) that the physical interfaces 502 and 504 may be interconnected with other as desired in configuring the interconnection of the trusted network 14 and the untrusted network.

The appliance 500 includes a platform 510 supporting its operation. The platform 510 comprises the underlying hardware, operation system and core infrastructure facilities necessary to allow the appliance 500 to provide an execution environment for security application. This execution environment includes operations, administration, maintenance and provisioning facilities, an embedded operating system supporting the execution of security applications, and hardware (such as chassis, power supply, expansion capabilities, circuit card support, and the like).

The appliance 500 further includes a security application functionality 512 that executes on the platform and which, in the preferred embodiment, is implemented as the unified network defense system 10 shown in FIGS. 1 and 2 and described in detail herein. Generally speaking, the security application functionality 512 comprises the processes and functions necessary to have the platform 510 function as a network security appliance 500 as opposed to a generic network platform. More specifically, as discussed above, the security application functionality 512 integrates a network discovery functionality, an intrusion detection functionality and a firewalling functionality together to act as a single, highly intelligent, highly adaptive, network-based information security system 10. The system 10 is advantageously self-deploying and self-hardening.

Additionally, the appliance 500 includes a local security manager 514 that is responsible for providing the interfaces, tools and processes that configure and monitor the operation of the appliance itself. This implicates network configuration (IP address, netmask, and the like), management access method attributes (access method enable flags, authentication data, login data, and the like), hardware settings, and other overall appliance 500 attributes.

The internal physical interfaces 504 maybe dedicated to certain elements in the protected network 14. For example, physical interface 504(1) is a dedicated router port that is connected to the router 520. In this situation, there is no need for the system 10 to engage in any scanning of that physical interface (and the network elements connected thereto) since the existence of the router 520 is assumed. Record of the router 520 is kept in the database 12/140 (see, FIGS. 1 and 2) as enterprise resource data 16 for use by the security application functionality 512. Other physical interfaces 504 may be assigned certain elements of the protected network 14 by the network administrator. For example, physical interface 504(2) is connected to an HTTP server 522, and knowledge of this connection is supplied by the network administrator to the database 12/140 as enterprise resource data 16 for use by the security application functionality 512. Additionally, there may exist instances where no dedication is assumed and the network administrator may not be intimately familiar with the network elements connected to a certain physical interface 504 (such as is generally shown with physical interfaces 504(3)-504(n)). In this situation, the network discovery functionality 112 (or the vulnerability assessment scanner 18) of the security application functionality 512 must scan the network and obtain the needed enterprise resource data 16 for the network elements connected to those physical interfaces 504.

With knowledge of the enterprise resource data 16 relating to each one of the physical interfaces 504, the security application functionality 512 (i.e., the system 10) is now aware of the vulnerabilities of the protected network 14, in general, and the network elements and configuration connected to each physical interface 504, in particular. Using this information, appropriate detection signatures 22/22' may be designed and instantiated 530 by the system 10 for each of the individual physical interfaces 504 based on what it is that is being protected in the network 14. For example, in the context of the system 10 implementation illustrated in FIG. 1, the agent 28 may instantiate 530 router vulnerability tailored detection signatures 22 for the comparison functionality 40 (or signatures 22' for comparison functionality 44 in the sentry 42) to monitor traffic being passed through physical interface 504(1) for handling by the router 520. Simultaneously, the agent 28 may instantiate 530 HTTP server vulnerability tailored detection signatures 22 for the comparison functionality 40 (or signatures 22' for comparison functionality 44 in the sentry 42) to monitor HTTP server 522 traffic being passed through physical interface 504(2). Similar treatment may be made with respect to tailoring operation of the appliance to protect the network elements connected to the physical interfaces 504(3)-504(n). In this way, the appliance 500 provides threat prevention services that are customized to the specific vulnerability needs of the network elements connected to each physical interface 504.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A protection system for a first network of machines/hosts, comprising:
   a network discovery functionality which scans the first network to identify components present in the first network and their properties;
   a management agent which receives a detection signature for a type of attack pertinent to a certain component and/or certain property, the management agent operating to query the network discovery functionality to determine whether the certain component and/or the certain property are among the identified components and/or properties present in the first network and, if so, instantiate the detection signature for that type of attack and otherwise not instantiate the detection signature in order to minimize false detection;
   a traffic inspection agent that analyzes network traffic passing from a second network of machines/hosts into the first network of machines/hosts in view of instantiated detection signatures to identify passing content that is potentially harmful to the first network and issue alerts;
   a network entrance sentry coupled to receive the network traffic from the traffic inspection agent and which operates to prevent unauthorized access to the first network;
   an interlocking functionality supporting delivery of the traffic inspection agent issued alerts to the network entrance sentry; and
   the network entrance sentry further operating responsive to the traffic inspection agent issued alert to block the identified passing content that is potentially harmful to the first network from entering the first network.

2. The system of claim 1 further including:
   means for instantiating detection signatures designed to detect and block potentially harmful content on both the traffic inspection agent and the network entrance sentry.

3. The system of claim 1 further comprising means for tailoring the detection signature, prior to instantiation and based on the identified components and/or properties of the first network, as to a specification of what actions are to be taken and what reports to be generated in response to a detected attack.

4. The system of claim 1 wherein components comprise network devices and properties comprise applications running on those network devices.

5. A method for protection of a first network of machines/hosts, comprising:
   scanning the first network to identify components present in the first network and their properties;
   receiving a detection signature for a type of attack pertinent to a certain component and/or certain property;
   determining whether the certain component and/or the certain property are among the components and/or properties present in the first network identified by scanning;
   if so, instantiating the detection signature for that type of attack; and
   otherwise not instantiating the detection signature in order to minimize false detection;
   analyzing network traffic passing from a second network of machines/hosts into the first network of machines/hosts in view of instantiated detection signatures to identify passing content that is potentially harmful to the first network;
   issuing alerts responsive to detection of passing content that is potentially harmful;
   receiving the alerts at a firewall which also processes the network traffic and prevents unauthorized access to the first network; and
   blocking entrance of the identified passing content that is potentially harmful to the first network at the firewall in response to the received alerts.

6. The method of claim 5 further including:
   instantiating detection signatures designed to detect and block entrance of potentially harmful entering content.

7. The method of claim 5 further including tailoring the detection signature, prior to instantiation and based on the identified components and/or properties of the first network, as to a specification of what actions are to be taken and what reports to be generated in response to a detected attack.

8. The method of claim 5 wherein components comprise network devices and properties comprise applications running on those network devices.

9. A network protection system, comprising:
   a network discovery functionality associated with a first network of devices/hosts that scans the first network prior to an attack to detect computer system and network device vulnerabilities to an attack based on the devices/hosts which are present in the first network and provides a notification identifying the detected vulnerabilities of the first network which could potentially be subsequently exploited by such an attack;
   a security management agent receiving the notification identifying the detected vulnerabilities and operating to tailor a detection signature to address the vulnerability to attack detected by the network discovery functionality; and
   an intrusion detector functionality upon which the tailored detection signature is instantiated by the security management agent prior to attack, the intrusion detector functionality analyzing network traffic received by the first network from a second network of devices/hosts in view of the instantiated detection signature to protect against exploitation of the detected vulnerabilities of the first network in such an attack by identifying entering content that is potentially harmful to the first network and issuing alerts.

10. The system as in claim 9 further including:
a firewalling functionality upon which the tailored detection signature is instantiated by the security management agent, the firewalling functionality analyzing network traffic in view of the instantiated detection signature to block the potentially harmful content from entering the first network.

11. The system as in claim 9 further including:
a firewalling functionality operating to analyze the network traffic and prevent unauthorized access to the first network;
an interlocking functionality supporting delivery of the issued alert from the intrusion detector functionality to the firewalling functionality; and
the firewalling functionality responding to the intrusion detector functionality issued alert to block the potentially harmful content from entering the first network.

12. The system as in claim 9 wherein the tailored detection signature is configured in the context of the computer system and network device vulnerabilities of the first network to reduce a likelihood that the intrusion detector functionality will generate false positive alerts.

13. The system as in claim 9 wherein the tailored detection signature is configured in the context of the computer system and network device vulnerabilities of the first network to specify certain actions to be taken.

14. The system as in claim 9 wherein the network configuration includes a plurality of zones, and wherein the tailored detection signature is configured in the context of the computer system and network device vulnerabilities of the first network to be applicable to only certain ones of those zones.

15. The system as in claim 9 wherein the network configuration includes identified machines, and wherein the tailored detection signature is configured in the context of the computer system and network device vulnerabilities of the first network to be applicable to only certain ones of those machines.

16. A method for network protection, comprising:
scanning a first network of devices/hosts prior to an attack to detect computer system and network device vulnerabilities to an attack based on the devices/hosts which are present in the network;
providing a notification the detected vulnerabilities of the first network which could potentially be subsequently exploited by such an attack;
tailoring a detection signature to address the notified vulnerability to attack detected by the scanning step in the context of a configuration of the first network being protected;
instantiating the tailored detection signature on a packet inspection agent prior to attack, the packet inspection agent analyzing network traffic received by the first network from a second network of devices/hosts in view of the instantiated detection signature to protect against exploitation of the detected vulnerabilities of the first network in such an attack by identifying passing content that is potentially harmful to the first network; and
issuing alerts in response to the identified potentially harmful passing content.

17. The method as in claim 16 further including:
instantiating the tailored detection signature on an entrance sentry functionality, the entrance sentry functionality analyzing network traffic in view of the instantiated detection signature to block the traffic associated with the potentially harmful passing content from entering the first network.

18. The method as in claim 16 further including:
delivering the issued alerts to an entrance sentry functionality; and
blocking entrance of the traffic associated with the detected potentially harmful content at the entrance sentry functionality in response to the delivered alerts.

19. The method as in claim 16 wherein tailoring the detection signature comprises configuring the detection signature in the context of the computer system and network device vulnerabilities of the first network to reduce a likelihood that the packet inspection agent will generate false positive alerts.

20. The method as in claim 16 wherein tailoring the detection signature comprises configuring the detection signature in the context of the computer system and network device vulnerabilities of the first network to specify certain actions to be taken.

21. The method as in claim 16 wherein the network configuration includes a plurality of zones, and wherein tailoring the detection signature comprises configuring the detection signature in the context of the computer system and network device vulnerabilities of the first network to be applicable to only certain ones of those zones.

22. The method as in claim 16 wherein the network configuration includes identified machines, and wherein tailoring the detection signature comprises configuring the detection signature in the context of the computer system and network device vulnerabilities of the first network to be applicable to only certain ones of those machines.

23. A defense system for a first network of machines/hosts, comprising:
a network discovery functionality operating to scan the first network of machines/hosts to detect computer system and network device vulnerabilities to a future attack;
an intrusion detector functionality operating to monitor traffic entering the first network of machines/hosts from a second network of machines/hosts and identify a current attack from entering content that is potentially harmful to the first network;
a firewalling functionality operating to block unauthorized access to the first network of machines/hosts from the second network and block harmful content received from the second network from entering the first network;
a management agent interconnecting the network discovery functionality, intrusion detector functionality and firewalling functionality together such that a self-deploying and self-hardening security defense is provided for the first network;
wherein the management agent supports the self-deployed security defense by having the network discovery functionality, intrusion detector functionality and firewalling functionality work together to automate threat detection and threat response operations; and
wherein the management agent supports the self-hardening security defense by having the network discovery functionality, intrusion detector functionality and firewalling functionality implement threat detection and threat response operations in a manner that mitigates instances of false detection.

24. The system of claim 23 wherein the management agent supports self-hardening security defense by instantiating and not instantiating a received detection signature on at least one of the intrusion detector functionality and firewalling functionality based on whether the network discovery functionality scan of the first network indicates that the machines/hosts are vulnerable to an attack to which the detection signature provides a defense.

25. The system of claim 23 wherein the management agent supports self-hardening security defense by selecting when and how a received detection signature is instantiated on at least one of the intrusion detector functionality and firewalling functionality based on the machines/hosts of the first network which are identified by the network discovery functionality scan of the first network.

26. The system of claim 23 wherein the management agent supports self-hardening security defense by modifying detection criteria and response actions of a received detection signature prior to instantiation on at least one of the intrusion detector functionality and firewalling functionality based on the machines/hosts of the first network which are identified by the network discovery functionality scan of the first network.

27. The system of claim 23 wherein the management agent supports self-hardening security defense by tailoring a received detection signature for application to certain machines/hosts of the first network which are identified by the network discovery functionality scan of the first network and instantiating the tailored detection signature on at least one of the intrusion detector functionality and firewalling functionality.

28. A method for providing network defense, comprising:
using a network discovery functionality operating to scan a first network of machines/hosts to detect computer system and network device vulnerabilities to a future attack, an intrusion detector functionality operating to monitor traffic entering the first network of machines/hosts from a second network of machines/hosts and identify a current attack from entering content that is potentially harmful to the first network and a firewalling functionality operating to block unauthorized access to the first network of machines/hosts from the second network and block harmful content received from the second network from entering the first network,
integrating the network discovery functionality, intrusion detector functionality and firewalling functionality together such that a self-deploying and self-hardening security defense is provided for the first network of machines/hosts;
wherein integrating achieves the self-deploying security defense by having the network discovery functionality, intrusion detector functionality and firewalling functionality work together to automate threat detection and threat response operations and achieves the self-hardening security defense by having the network discovery functionality, intrusion detector functionality and firewalling functionality implement threat detection and threat response operations in a manner that mitigates instances of false detection.

29. The method of claim 28 wherein integrating supports self-hardening security defense by instantiating and not instantiating a received detection signature on at least one of the intrusion detector functionality and firewalling functionality based on whether the network discovery functionality scan of the first network indicates that the machines/hosts are vulnerable to an attack to which the detection signature provides a defense.

30. The method of claim 28 wherein integrating supports self-hardening security defense by selecting when and how a received detection signature is instantiated on at least one of the intrusion detector functionality and firewalling functionality based on the machines/hosts of the first network which are identified by the network discovery functionality scan of the first network.

31. The method of claim 28 wherein integrating supports self-hardening security defense by modifying detection criteria and response actions of a received detection signature prior to instantiation on at least one of the intrusion detector functionality and firewalling functionality based on the machines/hosts of the first network which are identified by the network discovery functionality scan of the first network.

32. The method of claim 28 wherein integrating supports self-hardening security defense by tailoring a received detection signature for application to certain machines/hosts of the first network which are identified by the network discovery functionality scan of the first network and instantiating the tailored detection signature on at least one of the intrusion detector functionality and firewalling functionality.

33. A defense system for a first network of machines/hosts, comprising:
a traffic inspection agent that recognizes, from an analysis of passing network traffic concerning the first network of machines/hosts, that a new machine has been installed on the first network, the agent issuing a scan trigger in response thereto;
a network discovery function, operating responsive to the issued scan trigger, for scanning the first network, finding the new machine, and identifying a network vulnerability to an attack which is attributable to the presence of the new machine; and
the traffic inspection agent responding to the identified network vulnerability to instantiate a detection signature for detecting possible exploitation of that vulnerability to attack in connection with network traffic received by the first network from a second network of machines/hosts connected to the first network.

34. The system as in claim 33 wherein the traffic inspection agent further operates to tailor the detection signature to a configuration of the first network.

35. The system as in claim 33 further comprising:
a network entrance sentry operating to prevent unauthorized access to the first network;
wherein the traffic inspection agent further operates to instantiate a detection signature on the network entrance sentry for detecting possible exploitation of that vulnerability and blocking second network originated traffic associated with that possible exploitation from entering the first network.

36. The system as in claim 33 wherein the analysis of passing second network originated network traffic performed by the traffic inspection agent infers presence of the new machine on the first network from detection of unrecognizable information in a packet header.

37. A method for defense of a first network of machines/hosts, comprising:
analyzing passing network traffic concerning the first network of machines/hosts to recognize that a new machine has been installed on the first network;

issuing a scan trigger in response thereto;

scanning the first network in response to the scan trigger to find the new machine and identify a network vulnerability to an attack which is attributable to the presence of the new machine; and instantiating a detection signature in response to the identified vulnerability for detecting possible exploitation of that vulnerability in connection with network traffic received by the first network from a second network of machines/hosts connected to the first network.

38. The method as in claim 37 further including tailoring the detection signature to a configuration of the first network.

39. The method as in claim 37 further comprising:

instantiating a detection signature at an entrance to the first network for detecting possible exploitation of that vulnerability and blocking second network originated traffic associated with that possible exploitation from entering the first network.

40. The method as in claim 37 wherein analyzing comprises:

examining a header portion of packets in the passing network traffic; and inferring presence of the new machine in the first network from detection of unrecognizable information in the packet header portion.

* * * * *